US009838129B2

(12) United States Patent
Luo et al.

(10) Patent No.: US 9,838,129 B2
(45) Date of Patent: Dec. 5, 2017

(54) OPTICAL LINE TERMINAL, COMMUNICATIONS METHOD, AND PASSIVE OPTICAL NETWORK SYSTEM

(71) Applicant: Huawei Technologies Co., Ltd., Shenzhen (CN)

(72) Inventors: Xianjia Luo, Shenzhen (CN); Binchao Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/181,193

(22) Filed: Jun. 13, 2016

(65) Prior Publication Data

US 2017/0063462 A1 Mar. 2, 2017

Related U.S. Application Data

(63) Continuation of application No. PCT/CN2013/089435, filed on Dec. 13, 2013.

(51) Int. Cl.
*H04B 10/27* (2013.01)
*H04Q 11/00* (2006.01)
(Continued)

(52) U.S. Cl.
CPC .......... *H04B 10/27* (2013.01); *H04B 10/272* (2013.01); *H04L 41/0803* (2013.01); *H04Q 11/0062* (2013.01); *H04Q 2011/0079* (2013.01)

(58) Field of Classification Search
CPC .. H04B 10/27; H04B 10/272; H04Q 11/0062; H04Q 2011/0079; H04L 41/0803
See application file for complete search history.

(56) References Cited

U.S. PATENT DOCUMENTS

| 2008/0037986 A1 | 2/2008 | Effenberger |
| 2011/0029773 A1 | 2/2011 | Effenberger |
| 2011/0229131 A1 | 9/2011 | Izenberg et al. |

FOREIGN PATENT DOCUMENTS

| CN | 101141309 A | 3/2008 |
| CN | 101179433 A | 5/2008 |

(Continued)

OTHER PUBLICATIONS

"Series G: Transmission Systems and Media, Digital Systems and Networks; Digital section and digital line system—Optical line systems for local and access networks; Gigabit-capable passive optical networks (G-PON): ONT management and control interface specification; Amendment 3: Clarification of scope of application," Recommendation ITU-T G.984.4 (2008)—Amendment 3, pp. i-2, International Telecommunication Union, Geneva, Switzerland (Jul. 2010).

(Continued)

*Primary Examiner* — Leslie Pascal
(74) *Attorney, Agent, or Firm* — Leydig, Voit & Mayer, Ltd.

(57) ABSTRACT

The present disclosure disclose an optical line terminal, including: an acquiring unit, configured to acquire device information of an optical network terminal that registers and gets online; a determining unit, configured to match the device information of the optical network terminal with an interoperability mode configuration table preset on the optical line terminal, and determine whether an interoperability mode obtained by matching is the same as a current interoperability mode; an instructing unit, configured to instruct, if the interoperability mode obtained by matching is different from the current interoperability mode, the optical network terminal to be reset, reregister, and get online; and a configuring unit, configured to switch the current interoperability mode to the interoperability mode obtained by matching, (Continued)

and configure and manage the optical network terminal according to the interoperability mode obtained by matching.

15 Claims, 3 Drawing Sheets

(51) Int. Cl.
   *H04L 12/24* (2006.01)
   *H04B 10/272* (2013.01)

(56) References Cited

FOREIGN PATENT DOCUMENTS

| CN | 101197627 A | 6/2008 |
|---|---|---|
| CN | 102149025 A | 8/2011 |
| CN | 103368650 A | 10/2013 |
| EP | 1858185 A2 | 11/2007 |
| EP | 1990950 A1 | 11/2008 |
| EP | 2211488 A1 | 7/2010 |
| EP | 2765735 A1 | 8/2014 |
| EP | 2827532 A1 | 1/2015 |
| WO | 2012167541 A1 | 12/2012 |

OTHER PUBLICATIONS

"Series G: Transmission Systems and Media, Digital Systems and Networks; Digital sections and digital line system—Optical line systems for local and access networks; ONU management and control interface (OMCI) specification," Recommendation ITU-T G.988, pp. i-585, International Telecommunication Union, Geneva, Switzerland (Oct. 2012).

OPTICAL LINE TERMINAL, COMMUNICATIONS METHOD, AND PASSIVE OPTICAL NETWORK SYSTEM

CROSS-REFERENCE TO RELATED APPLICATIONS

This application is a continuation of International Application No. PCT/CN2013/089435, filed Dec. 13, 2013, which is hereby incorporated by reference in its entirety.

TECHNICAL FIELD

The present disclosure relates to the field of communications technologies and, in particular, to an optical line terminal, a communications method, and a passive optical network system.

BACKGROUND

A gigabit-capable passive optical network (GPON) or a 10-gigabit-capable passive optical network (XG-PON) system generally include three parts: an optical line terminal (OLT) at a central office end, an optical distribution network (ODN), and an optical network terminal (ONT). Multiple ONT devices may be connected to GPON ports of a same OLT by using the ODN, where a natural broadcast mode is used on a downlink, and a time division multiplexing mode is used on an uplink. An ONT management and control interface (OMCI) is an interface specification defined in GPON standards, for managing an ONT by an OLT. When the ONT registers with the OLT, an OMCI channel is established, and an OMCI message is transmitted between the OLT and the ONT through the established OMCI channel. The OMCI is a master-slave management protocol, in which the OLT is a master device and the ONT is a slave device. Through OMCI channels, the OLT controls multiple ONT devices connected to the OLT. In the OMCI protocol, various resources and services of the ONT managed by the OLT are abstracted into a protocol-independent management information base (MIB), where a basic information element in the management information base is a management entity (ME), and an instance is specific implementation of the managed entity. In the OMCI message delivered to the ONT, the OLT manages and controls the ONT by performing an operation, such as Create/delete Delete/set Set/Get, on a managed entity specific instance.

The OMCI standard is specified by the International Telecommunication Union-Telecommunication Standardization Sector (ITU-T). It defines in detail entities and attributes related to ONT configuration, fault management, and performance statistics in an optical access system. With development of a GPON application, the OMCI standard is also evolved continuously. In standards of new versions, there may be cases in which a managed entity is added, or a management entity or a management entity combination used for a same function is replaced with another new managed entity or managed entity combination, and there are cases in which ONTs produced and delivered in different time periods comply with standards of different OMCI protocol versions. Therefore, a great challenge is imposed to compatibility of an OLT with an ONT of a history version in a live network. In addition, in an evolution process of the OMCI standard specified by the ITU-T, to meet customer requirements, device vendors make private extensions of functions based on different version baselines; and based on ITU-T standards, add some managed entities according to service requirements, and supplement new ITU-T standards with definitions of managed entities for a same function. However, for the same function, managed entity definitions added by different operators may be different, and managed entity definitions added by operators may be different from managed entity definitions added later by the ITU-T. Therefore, for the same function, when an OLT needs to be interconnected with ONTs from different vendors or ONTs that comply with standards of particular operators, there are multiple choices of configured OMCI managed entities. This imposes a greater challenge to interoperability.

In the prior art, when an OLT manages ONTs that are of different hardware types or support different OMCI protocol versions, for a same function, the ONTs are configured and managed by using different command lines, and different command lines are correspondingly used to configure different command lines. Because there are multiple sets of command lines, management complexity and costs are increased. If a same command line is used for a same function when the OLT manages the ONTs of different hardware types or different OMCI protocol versions, the OLT determines, according to the OMCI protocol versions supported and reported by the ONTs and extended entities supported by the ONTs, a manner for sending corresponding OMCI managed entities to the ONTs. In this way, when ONTs of a same hardware type need to adapt to different markets, customization is required. For example, for an ONT of type A, if a network entry test is required by operator a, the ONT of type A needs to comply with a specification of operator a, and an entity extended by operator a needs to be customized and reported, but in markets of other operators, entities extended by the other operators instead of operator a need to be reported. Therefore, a large quantity of ONTs needs to be configured, which affects ONT production and delivery.

SUMMARY

Embodiments of the present disclosure provide an optical line terminal, a communications method, and a passive optical network system to solve a problem that management complexity and management costs are high when an OLT is compatible with ONTs supporting different managed entities and that complex customization is required for production or delivery when ONTs of a same type are used in markets of different operators.

According to a first aspect, an embodiment of the present disclosure provides an optical line terminal, where the optical line terminal may include:

an acquiring unit, configured to acquire device information of an optical network terminal that registers and gets online;

a determining unit, configured to match the device information of the optical network terminal with an interoperability mode configuration table preset on the optical line terminal, and determine whether an interoperability mode obtained by matching is the same as a current interoperability mode;

an instructing unit, configured to instruct, if the interoperability mode obtained by matching is different from the current interoperability mode, the optical network terminal to be reset, reregister, and get online; and a configuring unit, configured to switch the current interoperability mode to the interoperability mode obtained by matching, and configure and manage the optical network terminal according to the interoperability mode obtained by matching; where in different interoperability modes, the optical line terminal uses a same command line when configuring and managing a same function of the optical network terminal.

In a first possible implementation manner of the first aspect, if the interoperability mode obtained by matching is the same as the current interoperability mode, the configuring unit is configured to directly configure and manage the optical network terminal according to the current interoperability mode.

With reference to the first aspect or with reference to the first possible implementation manner of the first aspect, in a second possible implementation manner, the acquiring unit is specifically configured to:

send a management information base upload instruction to the optical network terminal;

receive a management information base returned by the optical network terminal; and extract the device information of the optical network terminal from the management information base.

With reference to the first aspect or with reference to the first or second possible implementation manner of the first aspect, in a third possible implementation manner, the instructing unit is specifically configured to:

send a management information base reset instruction to the optical network terminal, and clear configuration information on the optical network terminal; and instruct the optical network terminal to reregister and get online.

With reference to the first aspect or with reference to the first or second or third possible implementation manner of the first aspect, in a fourth possible implementation manner, the configuring unit is further configured to:

before the acquiring unit acquires the device information of the optical network terminal that registers and gets online, configure the current interoperability mode to an interoperability mode based on an ITU-T standard.

With reference to the first aspect or with reference to the first or second or third or fourth possible implementation manner of the first aspect, in a fifth possible implementation manner, the device information of the optical network terminal includes at least one of or any combination of vendor information, device name information, or supported OMCI protocol version information of the optical network terminal.

According to a second aspect, an embodiment of the present disclosure provides a communications method, where the communications method may include:

acquiring, by an optical line terminal, device information of an optical network terminal that registers and gets online;

matching the device information of the optical network terminal with an interoperability mode configuration table preset on the optical line terminal, and determining whether an interoperability mode obtained by matching is the same as a current interoperability mode;

instructing, if the interoperability mode obtained by matching is different from the current interoperability mode, the optical network terminal to be reset, reregister, and get online; and switching the current interoperability mode to the interoperability mode obtained by matching, and configuring and managing the optical network terminal according to the interoperability mode obtained by matching; where in different interoperability modes, the optical line terminal uses a same command line when configuring and managing a same function of the optical network terminal.

In a first possible implementation manner of the second aspect, if the interoperability mode obtained by matching is the same as the current interoperability mode, the configuring unit is configured to directly configure and manage the optical network terminal according to the current interoperability mode.

With reference to the second aspect or with reference to the first possible implementation manner of the second aspect, in a second possible implementation manner, the acquiring unit is specifically configured to:

send a management information base upload instruction to the optical network terminal;

receive a management information base returned by the optical network terminal; and extract the device information of the optical network terminal from the management information base.

With reference to the second aspect or with reference to the first or second possible implementation manner of the second aspect, in a third possible implementation manner, the instructing unit is specifically configured to:

send a management information base reset instruction to the optical network terminal, and clear configuration information on the optical network terminal; and instruct the optical network terminal to reregister and get online.

With reference to the second aspect or with reference to the first or second or third possible implementation manner of the second aspect, in a fourth possible implementation manner, the configuring unit is further configured to:

before the acquiring unit acquires the device information of the optical network terminal that registers and gets online, configure the current interoperability mode to an interoperability mode based on an ITU-T standard.

With reference to the second aspect or with reference to the first or second or third or fourth possible implementation manner of the second aspect, in a fifth possible implementation manner, the device information of the optical network terminal includes at least one of or any combination of vendor information, device name information, or supported OMCI protocol version information of the optical network terminal.

According to a third aspect, an embodiment of the present disclosure provides a passive optical network system, where the passive optical network system includes an optical line terminal, an optical splitter, and an optical network unit, and the optical line terminal is connected to the optical network unit by using the optical splitter, where the optical line terminal is configured to perform the method according to the first aspect or any implementation manner of the first aspect.

Embodiments of the present disclosure have the following advantageous effects:

Device information of an ONT is acquired and is matched with an interoperability mode configuration table preset on an OLT, and then whether to update a current interoperability mode is determined according to an interoperability mode obtained by matching. In this way, an interoperability mode between the OLT and the ONT is an optimal interoperability mode, the OLT is compatible with ONTs that are of different hardware types or support different OMCI protocol versions, functions of different ONTs are fully played, it is unnecessary to customize and change a large quantity of ONTs, and management is convenient and management costs are low. In addition, device update costs for updating and replacing ONTs can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
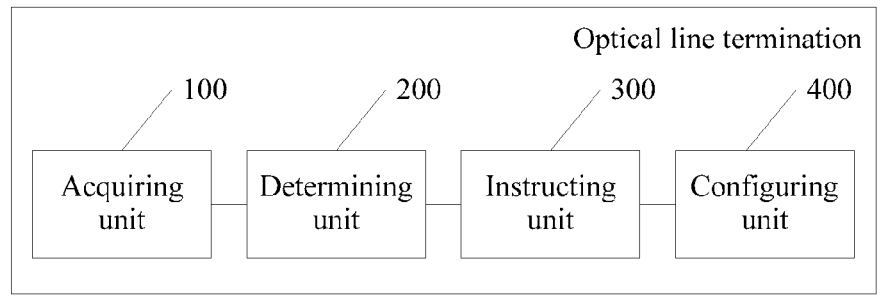
FIG. 1 is a schematic composition diagram of a first embodiment of an optical line terminal according to the present disclosure.

Referring to FIG. 1, FIG. 1 is a schematic composition diagram of a first embodiment of an optical line terminal according to the present disclosure. In this embodiment, the optical line terminal includes:

an acquiring unit 100, configured to acquire device information of an optical network terminal that registers and gets online;

a determining unit 200, configured to match the device information of the optical network terminal with an interoperability mode configuration table preset on the optical line terminal, and determine whether an interoperability mode obtained by matching is the same as a current interoperability mode;

an instructing unit 300, configured to instruct, if the interoperability mode obtained by matching is different from the current interoperability mode, the optical network terminal to be reset, reregister, and get online; and a configuring unit 400, configured to switch the current interoperability mode to the interoperability mode obtained by matching, and configure and manage the optical network terminal according to the interoperability mode obtained by matching; where in different interoperability modes, the optical line terminal uses a same command line when configuring and managing a same function of the optical network terminal.

If the interoperability mode obtained by matching is the same as the current interoperability mode, the configuring unit 400 is configured to directly configure and manage the optical network terminal according to the current interoperability mode.

Preferably, the acquiring unit 100 is specifically configured to:

send a management information base upload MIB Upload instruction to the optical network terminal;

receive a management information base MIB returned by the optical network terminal; and extract the device information of the optical network terminal from the management information base MIB.

Optionally, the device information of the optical network terminal may include at least one of vendor information, device name information, or supported OMCI protocol version information of the optical network terminal.

The instructing unit 300 may be specifically configured to:

send a management information base reset MIB Reset instruction to the optical network terminal, and clear configuration information on the optical network terminal; and instruct the optical network terminal to reregister and get online.

Preferably, the configuring unit 400 is further configured to:

before the acquiring unit 100 acquires the device information of the optical network terminal that registers and gets online, configure the current interoperability mode to an interoperability mode based on an ITU-T standard.

It should be noted that the acquiring unit 100, the determining unit 200, the instructing unit 300, and the configuring unit 400 may exist independently or may be disposed in an integrated manner, and that the acquiring unit 100, the determining unit 200, the instructing unit 300, or the configuring unit 400 in the foregoing embodiment of the optical line terminal may be disposed independently of a processor of the optical line terminal in a form of hardware, where a form of disposition may be a form of a microprocessor, or may be built in a processor of the optical line terminal in a form of hardware, or may be stored in a memory of the optical line terminal in a form of software, so that the processor of the optical line terminal and performs an operation corresponding to the acquiring unit 100, the determining unit 200, the instructing unit 300, or the configuring unit 400.

For example, in the first embodiment of the optical line terminal according to the present disclosure (the embodiment shown in FIG. 1), the determining unit 200 may be a processor of the optical line terminal; the acquiring unit 100, the instructing unit 300, and the configuring unit 400 may be functionally built in the processor or may be disposed independently of the processor, or may be stored in a memory in a form of software, so that the processor invokes the units to implement their functions. Certainly, the acquiring unit 100 and the instructing unit 300 may be disposed in an integrated manner, or may be disposed independently, or may be disposed independently or disposed in an integrated manner as an interface circuit of the optical line terminal, which is not limited in this embodiment of the present disclosure. The processor may be a central processing unit (CPU), a microprocessor, a single-chip microcomputer, or the like.

Figure 2:
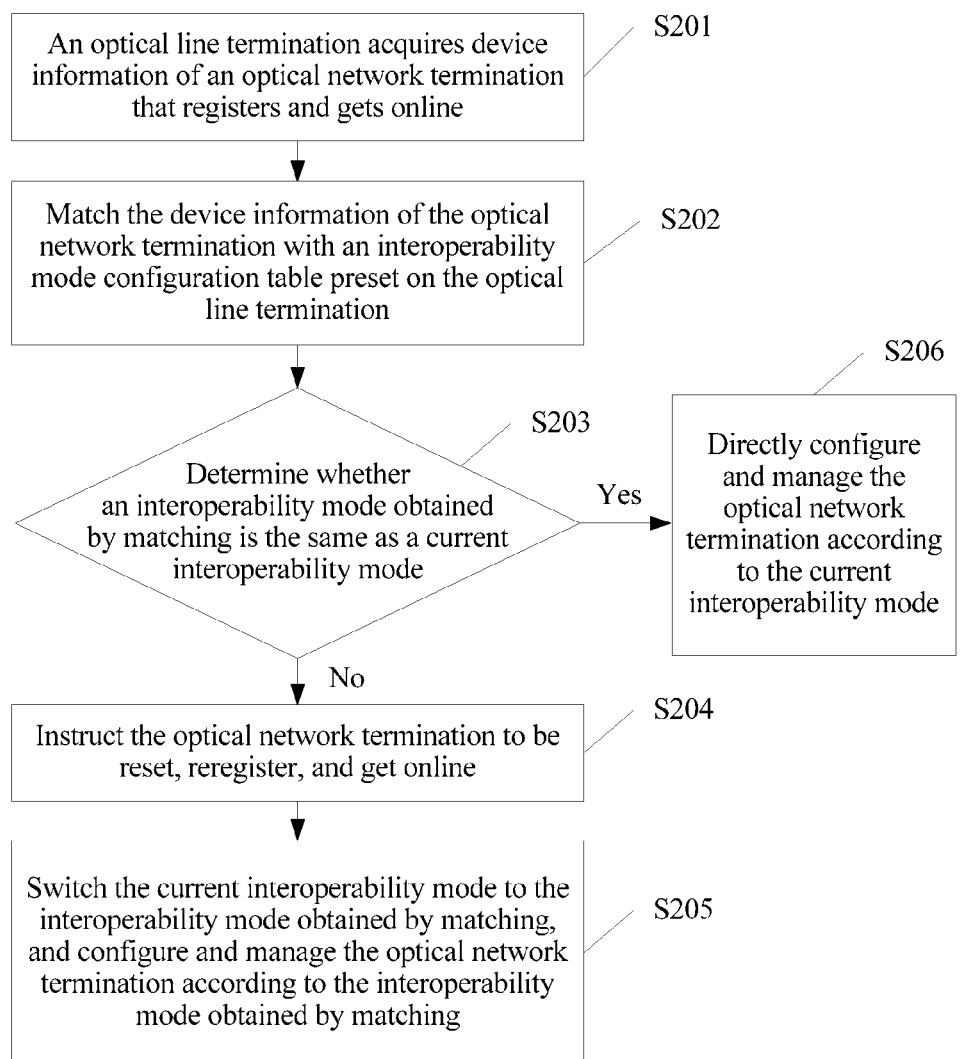
FIG. 2 is a schematic flowchart of a first embodiment of a communications method according to the present disclosure.

Referring to FIG. 2, FIG. 2 is a schematic flowchart of a first embodiment of a communications method according to the present disclosure. In this embodiment, the method includes the following steps:

S201. An optical line terminal acquires device information of an optical network terminal that registers and gets online.

Specifically, the device information of the optical network terminal includes at least one of vendor information, device name information, or supported OMCI protocol version information of the optical network terminal.

To meet user requirements, different vendors may need to extend functions of ONTs, so that ONTs produced by different vendors support different managed entities. Even ONTs produced by a same vendor may have different hardware types and support different functions and managed entities, and generally, ONTs of different hardware types may be distinguished by using different device names. In addition, because the OMCI standard is evolved continuously, ONTs produced in different time periods support different OMCI protocol versions, and managed entities configured for the ONTs may also be different. Therefore, the OLT may acquire any one of the foregoing information from a message uploaded by the ONT, to know a managed entity that needs to be configured for the ONT. Certainly, in addition to the foregoing information, the device information may also be any other information that can distinguish the ONT, which is not limited herein.

S202. Match the device information of the optical network terminal with an interoperability mode configuration table preset on the optical line terminal.

Specifically, according to managed entities that need to be configured for ONTs that are of different hardware types or support different OMCI protocol versions, interoperability modes between the OLT and different ONTs may be preconfigured to form an interoperability mode configuration table, and the interoperability mode configuration table is saved on the OLT in advance. In this way, when the OLT acquires the device information of the ONT, the OLT may know a hardware type of the ONT or an OMCI protocol version supported by the ONT, to know a managed entity that needs to be configured for the ONT. After matching is performed with the interoperability mode configuration table, a most appropriate interoperability mode between the OLT and the ONT can be known.

S203. Determine whether an interoperability mode obtained by matching is the same as a current interoperability mode. If the interoperability mode obtained by matching is the same as the current interoperability mode, step S206 is performed, or otherwise, steps S204 and S205 are performed.

S204. Instruct the optical network terminal to be reset, reregister, and get online.

S205. Switch the current interoperability mode to the interoperability mode obtained by matching, and configure and manage the optical network terminal according to the interoperability mode obtained by matching.

Specifically, when the interoperability mode obtained by matching is different from the current interoperability mode, which indicates that interoperability modes of a currently accessing ONT and the OLT are inconsistent, all functions of the currently accessing ONT cannot be implemented properly or completely. Therefore, in this case, the OLT needs to clear existing configuration information of the ONT, and instruct the ONT to reregister and get online.

Then the current interoperability mode is switched to the interoperability mode obtained by matching, and the optical network terminal is configured and managed according to the interoperability mode obtained by matching. In this way, different ONTs can be configured and managed most appropriately.

In different interoperability modes, the optical line terminal uses a same command line when configuring and managing a same function of the optical network terminal.

S206. Directly configure and manage the optical network terminal according to the current interoperability mode.

Because the interoperability mode obtained by matching is the same as the current interoperability mode, which indicates that the current interoperability mode is an optimal interoperability mode between the OLT and the currently accessing ONT, no change is required, and the ONT may be directly configured and managed according to the current interoperability mode.

In this embodiment, device information of an ONT is acquired and is matched with an interoperability mode configuration table preset on an OLT, and then whether to update a current interoperability mode is determined according to an interoperability mode obtained by matching. In this way, an interoperability mode between the OLT and the ONT is an optimal interoperability mode, the OLT is compatible with ONTs that are of different hardware types or support different OMCI protocol versions, functions of different ONTs are fully played, it is unnecessary to customize and change a large quantity of ONTs, and management is convenient and management costs are low. In addition, device update costs for updating and replacing ONTs can be reduced.

Figure 3:
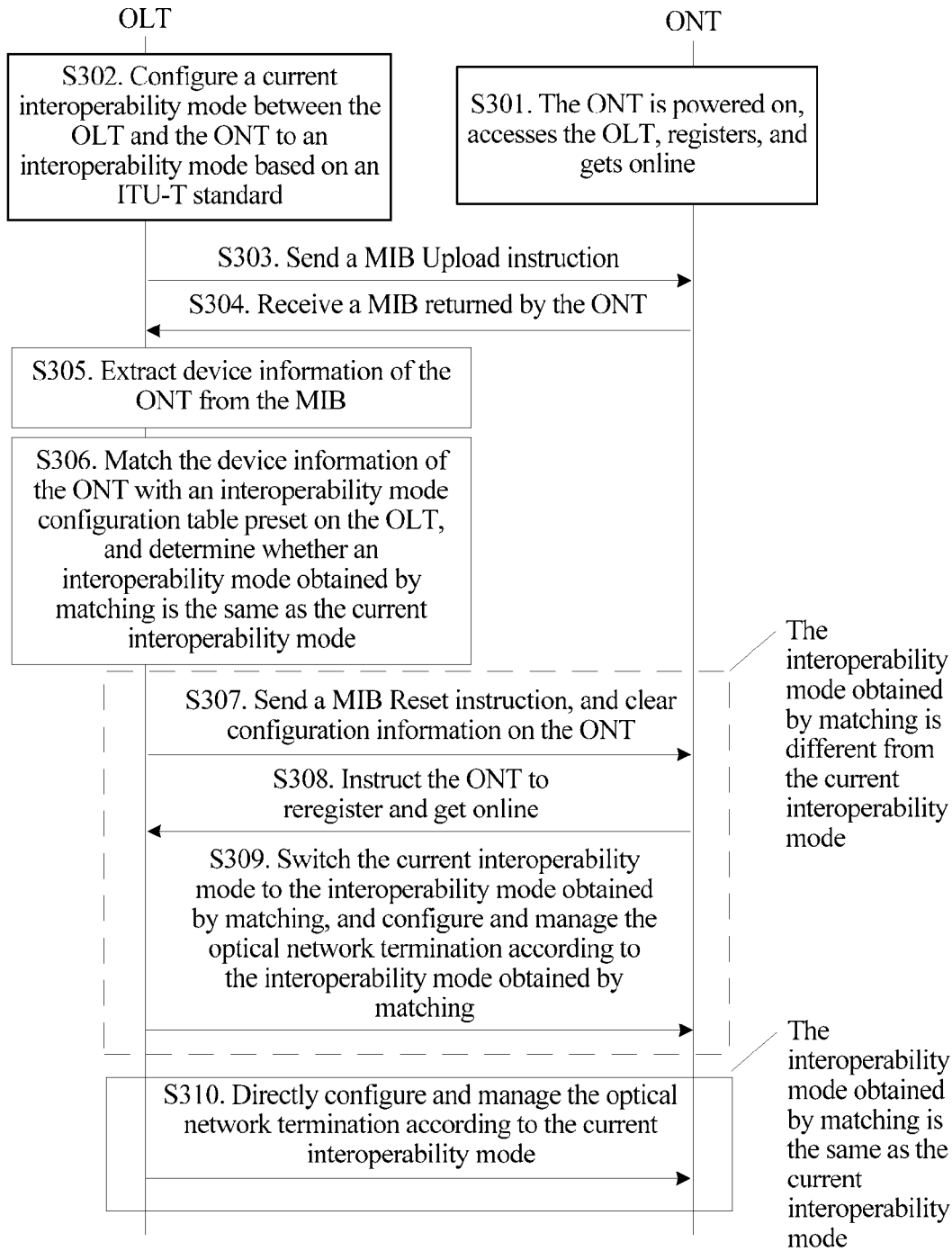
FIG. 3 is a schematic flowchart of a second embodiment of a communications method according to the present disclosure.

Referring to FIG. 3, FIG. 3 is a schematic flowchart of a second embodiment of a communications method according to the present disclosure. In this embodiment, the method includes the following steps:

S301. An ONT is powered on, accesses an OLT, registers, and gets online.

S302. Configure a current interoperability mode between the OLT and the ONT to an interoperability mode based on an ITU-T standard.

Because a majority of ONTs produced or delivered are based on the ITU-T standard, the interoperability mode based on the ITU-T standard may be preferentially used as a default interoperability mode between the OLT and the ONT. In this way, in a specific application, switching and changing of interoperability modes are not required for a majority of ONTs, a switching process of the OLT is not required, and access efficiency of the ONTs is improved.

S303. Send a management information base upload MIB Upload instruction.

The OLT may send the MIB Upload instruction to the ONT, to instruct the ONT to return information required by the OLT to the OLT. Certainly, in addition to the use of an existing MIB Upload instruction, a new instruction may be configured to instruct the ONT to upload MIB information, which is not limited herein.

S304. Receive a MIB returned by the ONT.

S305. Extract device information of the ONT from the MIB.

Specifically, the device information herein may be at least one of vendor information, device name information, or supported OMCI protocol version information of the ONT.

S306. Match the device information of the ONT with an interoperability mode configuration table preset on the OLT, and determine whether an interoperability mode obtained by matching is the same as the current interoperability mode.

Specifically, if the interoperability mode obtained by matching is the same as the current interoperability mode, step S310 in a solid line box shown in FIG. 3 is performed. If the interoperability mode obtained by matching is different from the current interoperability mode, steps S307 to S309 in a dashed line box are performed.

S307. Send a management information base reset MIB Reset instruction, and clear configuration information on the ONT.

Certainly, in addition to the use of an existing MIB Reset instruction, a new instruction may be reconfigured to instruct the ONT to be reset, which is not limited herein.

S308. Instruct the ONT to reregister and get online.

S309. Switch the current interoperability mode to the interoperability mode obtained by matching, and configure and manage the optical network terminal according to the interoperability mode obtained by matching.

S310. Directly configure and manage the optical network terminal according to the current interoperability mode.

Figure 4:
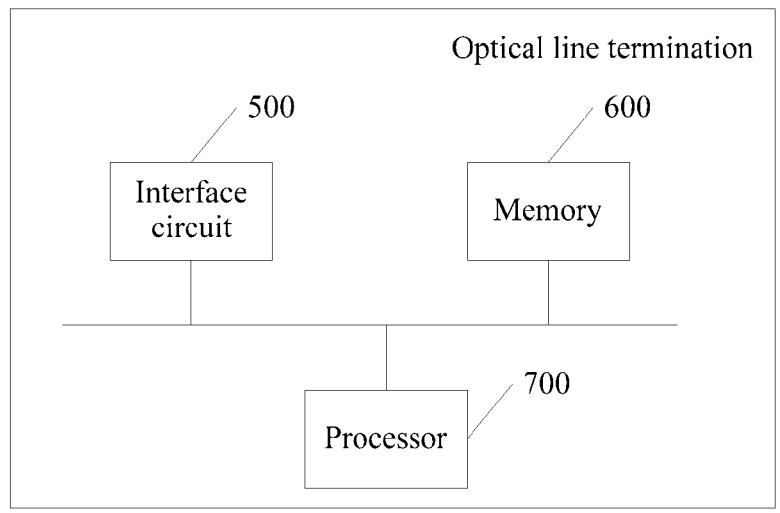
FIG. 4 is a schematic composition diagram of a second embodiment of an optical line terminal according to the present disclosure.

Referring to FIG. 4, FIG. 4 is a schematic composition diagram of a second embodiment of an optical line terminal according to the present disclosure. In this embodiment, the optical line terminal includes:

an interface circuit 500, a memory 600, and a processor 700 connected to the interface circuit 500 and the memory 600. The memory 600 is configured to store a group of program code. The processor 700 is configured to invoke the program code stored in the memory 600, to perform operations in either one of the first and second embodiments of the communications method according to the present disclosure.

Figure 5:
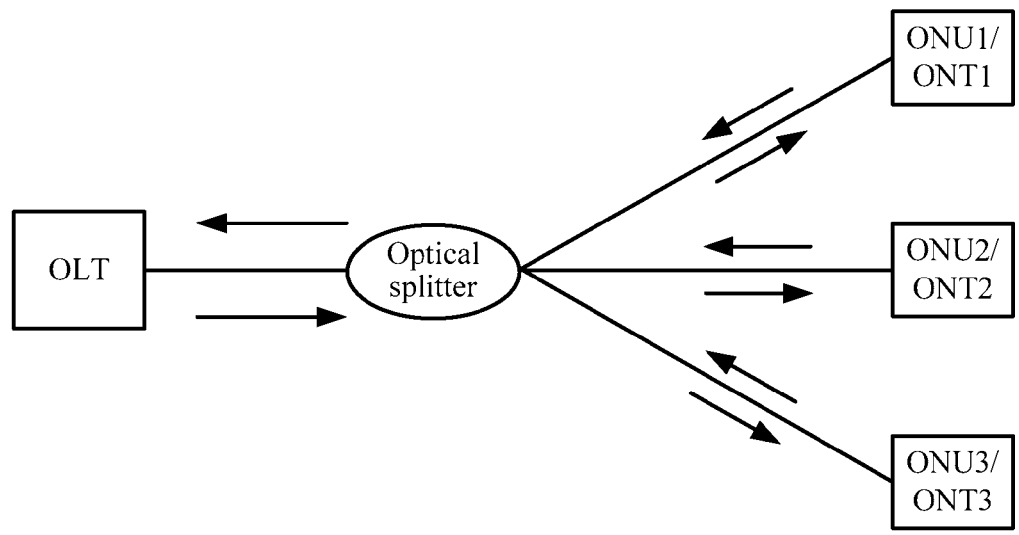
FIG. 5 is a schematic composition diagram of a passive optical network system according to the present disclosure.

An embodiment of the present disclosure further provides a passive optical network system. FIG. 5 is a schematic block diagram of an application scenario according to the embodiment of the present disclosure. As shown in FIG. 5, the passive optical network (PON) system may include an optical line terminal OLT located at a central office end, and an optical network terminal ONT/an optical network unit ONU. One OLT may be connected to one or more ONTs/ONUs (for example, an ONT/ONU1 and an ONT/ONU2) by using an optical splitter such as a passive optical splitter.

It should be understood that in the embodiment of the present disclosure, a transmission direction in which data or an optical signal carrying data is transmitted from the OLT to the ONT/ONU is referred to as a downlink direction, and correspondingly, an optical signal sent by the OLT to the ONT/ONU is also referred to as a downlink optical signal; similarly, a transmission direction in which data or an optical signal carrying data is transmitted from the ONT/ONU to the OLT is referred to as an uplink direction, and correspondingly, an optical signal sent by the ONT/ONU to the OLT is also referred to as an uplink optical signal.

It should also be understood that in the embodiment of the present disclosure, a method and an apparatus for detecting uplink optical signal power according to the embodiment of the present disclosure may be applied to a PON system using TDM, for example, a GPON system, an Ethernet passive optical network (EPON) system, a 10 G EPON system, or a 10 G GPON system. For ease of description, the GPON system is used as an example for description in the following, but the present disclosure is not limited thereto. In addition, for ease of description, the ONT instead of the ONT and/or ONU is used for description in the following, but the present disclosure is not limited thereto.

The OLT acquires device information of an optical network terminal that registers and gets online; matches the device information of the optical network terminal with an interoperability mode configuration table preset on the optical line terminal, and determines whether an interoperability mode obtained by matching is the same as a current interoperability mode; if the interoperability mode obtained by matching is different from the current interoperability mode, instructs the optical network terminal to be reset, reregister, and get online; and switches the current interoperability mode to the interoperability mode obtained by matching, and configures and manages the optical network terminal according to the interoperability mode obtained by matching; where in different interoperability modes, the optical line terminal uses a same command line when configuring and managing a same function of the optical network terminal.

The ONT is configured to send its own device information to the OLT.

The device information of the ONT includes at least one of or any combination of vendor information, device name information, or supported optical network terminal management and control interface protocol version information of the optical network terminal.

For details of a structure of the OLT, reference is made to FIG. 1 and the description of the embodiment corresponding to FIG. 1, which is not described herein again. In addition, the foregoing OLT can perform the methods in the embodiments corresponding to FIG. 2 and FIG. 3.

The ONT may send its own device information to the OLT after the OLT sends a command for acquiring the device information, or the ONT may actively send the device information to the OLT.

The OLT acquires device information of an ONT, and matches the device information with an interoperability mode configuration table preset on the OLT, and then determines, according to an interoperability mode obtained by matching, whether to update a current interoperability mode. In this way, an interoperability mode between the OLT and the ONT is an optimal interoperability mode, the OLT is compatible with ONTs that are of different hardware types or support different OMCI protocol versions, functions of different ONTs are fully played, it is unnecessary to customize and change a large quantity of ONTs, and management is convenient and management costs are low. In addition, device update costs for updating and replacing ONTs can be reduced.

It should be noted that the embodiments in this specification are all described in a progressive manner, each embodiment focuses on a difference from other embodiments, and for same or similar parts in the embodiments, reference may be made to these embodiments. For the apparatus embodiment, because it is basically similar to the method embodiment, the apparatus embodiment is described briefly, and for a related part, reference may be made to the part of the description of the method embodiment.

According to the descriptions of the foregoing embodiments, the present disclosure has the following advantages:

Device information of an ONT is acquired and is matched with an interoperability mode configuration table preset on an OLT, and then whether to update a current interoperability mode is determined according to an interoperability mode obtained by matching. In this way, an interoperability mode between the OLT and the ONT is an optimal interoperability mode, the OLT is compatible with ONTs that are of different hardware types or support different OMCI protocol versions, functions of different ONTs are fully played, it is unnecessary to customize and change a large quantity of ONTs, and management is convenient and management costs are low. In addition, device update costs for updating and replacing ONTs can be reduced.

It should be noted that the embodiments in this specification are all described in a progressive manner, each embodiment focuses on a difference from other embodiments, and for same or similar parts in the embodiments, reference may be made to these embodiments. For the apparatus embodiment, because it is basically similar to the method embodiment, the apparatus embodiment is described briefly, and for a related part, reference may be made to the part of the description of the method embodiment.

According to the descriptions of the foregoing embodiments, the present disclosure has the following advantages:

Device information of an ONT is acquired and is matched with an interoperability mode configuration table preset on an OLT, and then whether to update a current interoperability mode is determined according to an interoperability mode obtained by matching. In this way, an interoperability mode between the OLT and the ONT is an optimal interoperability mode, the OLT is compatible with ONTs that are of different hardware types or support different OMCI protocol versions, functions of different ONTs are fully played, it is unnecessary to customize and change a large quantity of ONTs, and management is convenient and management costs are low. In addition, device update costs for updating and replacing ONTs can be reduced.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The optical line terminal, the communications method, and the passive optical network system provided in the embodiments of the present disclosure are described in detail in the foregoing. In the specification, specific examples are used to describe principles and implementation manners of the present disclosure, and the descriptions of the foregoing embodiments are only intended to help understand the method and core ideas of the present disclosure. In addition, based on the ideas of the present disclosure, a person of ordinary skill in the art may make modifications with respect to the specific implementation manners and application scope. In conclusion, content of the specification shall not be construed as a limitation on the present disclosure.

What is claimed is:

1. An optical line terminal, comprising:
a processor; and
a computer-readable medium storing program codes that, when executed by the processor, cause the optical line terminal to:
acquire device information of an optical network terminal that registers and gets online;
match the device information of the optical network terminal with an interoperability mode configuration table preset on the optical line terminal, and determine whether an interoperability mode obtained by matching is the same as a current interoperability mode;
in response to determining that the interoperability mode obtained by matching is different from the current interoperability mode, instruct the optical network terminal to be reset, reregister, and get online; and
switch the current interoperability mode to the interoperability mode obtained by matching, and configure and manage the optical network terminal according to the interoperability mode obtained by matching, wherein in different interoperability modes, the optical line terminal uses a same command line when configuring and managing a same function of the optical network terminal.

2. The optical line terminal according to claim 1, wherein in response to determining that the interoperability mode obtained by matching is the same as the current interoperability mode, the program codes, when executed by the processor, further cause the optical line terminal to:
directly configure and manage the optical network terminal according to the current interoperability mode.

3. The optical line terminal according to claim 1, wherein the program codes, when executed by the processor, further cause the optical line terminal to:
send a management information base upload instruction to the optical network terminal;
receive a management information base returned by the optical network terminal; and
extract the device information of the optical network terminal from the management information base.

4. The optical line terminal according to claim 1, wherein the program codes, when executed by the processor, further cause the optical line terminal to:
send a management information base reset instruction to the optical network terminal, and clear configuration information on the optical network terminal; and
instruct the optical network terminal to reregister and get online.

5. The optical line terminal according to claim 1, wherein the device information of the optical network terminal comprises at least one of or any combination of:
vendor information,
device name information, and
supported optical network terminal management and control interface protocol version information of the optical network terminal.

6. A communications method, comprising:
acquiring, by an optical line terminal, device information of an optical network terminal that registers and gets online;
matching the device information of the optical network terminal with an interoperability mode configuration table preset on the optical line terminal, and determining whether an interoperability mode obtained by matching is the same as a current interoperability mode;
instructing, in response to determining that the interoperability mode obtained by matching is different from the current interoperability mode, the optical network terminal to be reset, reregister, and get online; and
switching the current interoperability mode to the interoperability mode obtained by matching, and configuring and managing the optical network terminal according to the interoperability mode obtained by matching, wherein in different interoperability modes, the optical line terminal uses a same command line when configuring and managing a same function of the optical network terminal.

7. The method according to claim 6, wherein in response to determining that the interoperability mode obtained by matching is the same as the current interoperability mode, the optical network terminal is directly configured and managed terminal according to the current interoperability mode.

8. The method according to claim 6, wherein the acquiring, by the optical line terminal, the device information of the optical network terminal that registers and gets online comprises:
sending a management information base upload instruction to the optical network terminal;
receiving a management information base returned by the optical network terminal; and
extracting the device information of the optical network terminal from the management information base.

9. The method according to claim 6, wherein the instructing, in response to determining that the interoperability mode obtained by matching is different from the current interoperability mode, the optical network terminal to be reset, reregister, and get online comprises:
  sending a management information base reset instruction to the optical network terminal, and clearing configuration information on the optical network terminal; and
  instructing the optical network terminal to reregister and get online.

10. The method according to claim 6, wherein the device information of the optical network terminal comprises at least one of or any combination of:
  vendor information,
  device name information, and
  supported optical network terminal management and control interface protocol version information of the optical network terminal.

11. A passive optical network system, comprising:
  an optical line terminal;
  an optical splitter; and
  an optical network unit, wherein the optical line terminal is connected to the optical network unit by using the optical splitter,
  wherein the optical line terminal comprises a computer-readable medium storing program codes that, when executed, cause the optical line terminal to:
    acquire device information of an optical network terminal that registers and gets online;
    match the device information of the optical network terminal with an interoperability mode configuration table preset on the optical line terminal, and determine whether an interoperability mode obtained by matching is the same as a current interoperability mode;
    in response to determining that the interoperability mode obtained by matching is different from the current interoperability mode, instruct the optical network terminal to be reset, reregister, and get online; and
    switch the current interoperability mode to the interoperability mode obtained by matching, and configure and manage the optical network terminal according to the interoperability mode obtained by matching,
  wherein in different interoperability modes, the optical line terminal uses a same command line when configuring and managing a same function of the optical network terminal.

12. The passive optical network system according to claim 11, wherein in response to determining that the interoperability mode obtained by matching is the same as the current interoperability mode, the program codes, when executed, further cause the optical line terminal to:
  directly configure and manage the optical network terminal according to the current interoperability mode.

13. The passive optical network system according to claim 11, wherein the program codes, when executed, further cause the optical line terminal to:
  send a management information base upload instruction to the optical network terminal;
  receive a management information base returned by the optical network terminal; and
  extract the device information of the optical network terminal from the management information base.

14. The passive optical network system according to claim 11, wherein the program codes, when executed, further cause the optical line terminal to:
  send a management information base reset instruction to the optical network terminal, and clear configuration information on the optical network terminal; and
  instruct the optical network terminal to reregister and get online.

15. The passive optical network system according to claim 11, wherein the device information of the optical network terminal comprises at least one of or any combination of:
  vendor information,
  device name information, and
  supported optical network terminal management and control interface protocol version information of the optical network terminal.

* * * * *